(12) United States Patent
Tsukamoto

(10) Patent No.: US 10,348,137 B2
(45) Date of Patent: Jul. 9, 2019

(54) POWER SUPPLY APPARATUS CAPABLE OF COMMUNICATION, CONTROL METHOD FOR THE SAME, AND STORAGE MEDIUM

(71) Applicant: CANON KABUSHIKI KAISHA, Tokyo (JP)

(72) Inventor: Nobuyuki Tsukamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/903,360

(22) Filed: Feb. 23, 2018

(65) Prior Publication Data

US 2018/0254670 A1  Sep. 6, 2018

(30) Foreign Application Priority Data

Mar. 1, 2017  (JP) ................................. 2017-038678

(51) Int. Cl.
| | | |
|---|---|---|
| *H04B 5/00* | (2006.01) | |
| *H04B 10/564* | (2013.01) | |
| *H02J 50/80* | (2016.01) | |
| *H02J 50/20* | (2016.01) | |

(52) U.S. Cl.
CPC ............. *H02J 50/20* (2016.02); *H02J 50/80* (2016.02); *H04B 5/0031* (2013.01); *H04B 5/0037* (2013.01); *H04B 5/0056* (2013.01)

(58) Field of Classification Search
CPC ........ H02J 50/20; H02J 50/80; H04B 5/0037; H04B 5/0031; H04B 5/0056; H04B 1/0475; H04B 2001/0416; H04B 5/0018; H04B 10/564; H04W 52/262
See application file for complete search history.

(56) References Cited

U.S. PATENT DOCUMENTS

| | | | | |
|---|---|---|---|---|
| 9,490,722 B2* | 11/2016 | Sakakibara | ......... | H02M 1/4225 |
| 2012/0063505 A1* | 3/2012 | Okamura | ............. | H04B 5/0006 375/238 |
| 2013/0002038 A1* | 1/2013 | Lee | ........................... | H02J 7/00 307/104 |

(Continued)

FOREIGN PATENT DOCUMENTS

JP  2010-039283 A  2/2010

*Primary Examiner* — Andrew Wendell
(74) *Attorney, Agent, or Firm* — Cowan, Liebowitz & Latman, P.C.

(57) ABSTRACT

A power supply apparatus comprises: a power supply unit configured to perform wireless power supply to an electronic device; a communication unit configured to communicate with the electronic device using power for the wireless power supply; one or more processors; and a memory storing instructions which, when the instructions are executed, cause the power supply apparatus to function as: an acquisition unit configured to acquire information for performing communication using the power; and a control unit configured to control communication with the electronic device based on the information, wherein in a case where the electronic device can perform communication using the power, the control unit controls the communication unit such that a modulation degree indicating a degree to which an amplitude changes in amplitude modulation for the communication is smaller the higher the power transmitted is.

11 Claims, 9 Drawing Sheets

(56) References Cited

U.S. PATENT DOCUMENTS

| | | | |
|---|---|---|---|
| 2014/0300197 A1* | 10/2014 | Wakabayashi | H01F 38/14 307/104 |
| 2014/0375138 A1* | 12/2014 | Sako | H02J 7/0027 307/104 |
| 2015/0031302 A1* | 1/2015 | Kawasaki | H04L 12/00 455/41.2 |
| 2016/0134334 A1* | 5/2016 | Park | H02J 5/005 307/104 |
| 2017/0202041 A1* | 7/2017 | Qin | H04L 1/16 |
| 2017/0207659 A1* | 7/2017 | Mofidi | H04B 5/0031 |
| 2018/0233956 A1* | 8/2018 | Moussaoui | H02J 50/12 |

* cited by examiner

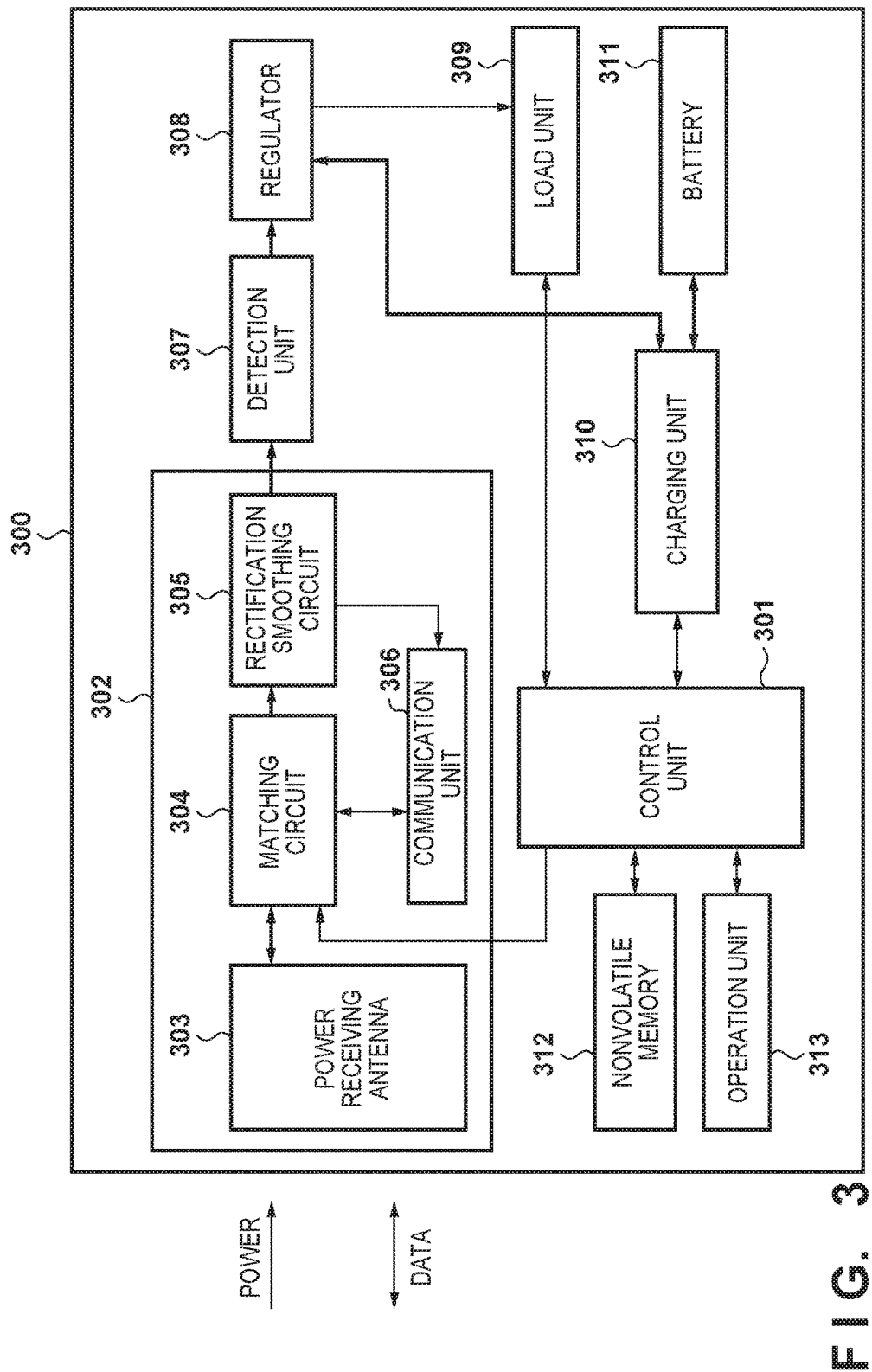
F I G. 3

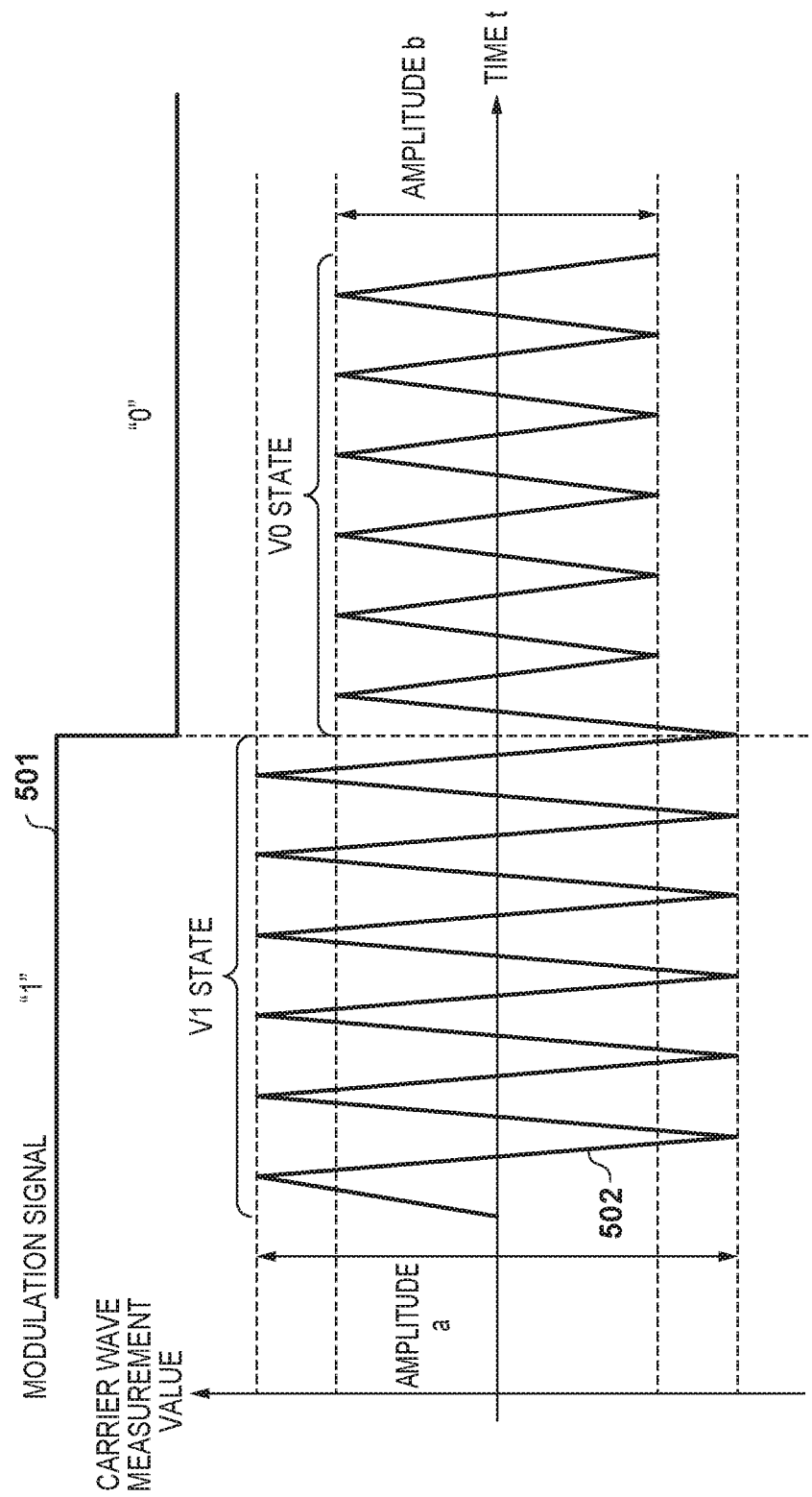
F I G. 5

POWER SUPPLY APPARATUS CAPABLE OF COMMUNICATION, CONTROL METHOD FOR THE SAME, AND STORAGE MEDIUM

BACKGROUND OF THE INVENTION

Field of the Invention

The present invention relates to a power supply apparatus capable of communication, a control method for the same, and a storage medium.

Description of the Related Art

In recent years, a wireless power supply system has been known which includes a power supply apparatus that supplies power wirelessly without being connected by a wire, and an electronic device that receives the power supplied from the power supply apparatus. With this kind of power supply system, a technique is known in which the electronic device, which is assumed to use a general-purpose power supply apparatus, checks the ability of the power supply apparatus using a current load that has been made variable, and displays functions that can be operated by the electronic device according to the checking results (Japanese Patent Laid-Open No. 2010-39283).

Incidentally, if a carrier wave output by the power supply apparatus during power supply is modulated with a modulation signal (baseband signal) indicating information to be transmitted, communication can be performed while power supply is being performed between the power supply apparatus and the electronic device. For this reason, if it is known that a nearby electronic device can communicate while power supply is being performed, a power supply apparatus can perform communication simultaneously while power supply is being performed.

Furthermore, the power of the signal (modulated wave) obtained by modulating a carrier wave with a baseband signal depends on the output (amplitude of the carrier wave) during power supply and the modulation degree, and if the output during power supply increases, the power of the modulated wave can also increase. However, even if the output during power supply is increased, it is necessary to suppress an increase in the power of the modulated wave to realize communication that satisfies a predetermined restriction (e.g., an allowable range under radio wave regulations set for each country).

SUMMARY OF THE INVENTION

The present invention has been made in consideration of the aforementioned problems, and realizes a technique according to which communication can be performed while power supply is performed according to an electronic device to which the power is to be supplied, and the power of a modulated signal can be suppressed with respect to an increase in the power being supplied.

In order to solve the aforementioned problems, one aspect of the present invention provides a power supply apparatus comprising: a power supply unit configured to perform wireless power supply to an electronic device; a communication unit configured to communicate with the electronic device using power for the wireless power supply; one or more processors; and a memory storing instructions which, when the instructions are executed by the one or more processors, cause the power supply apparatus to function as: an acquisition unit configured to acquire, from the electronic device, predetermined information for performing communication using the power; and a control unit configured to control communication with the electronic device by the communication unit based on the predetermined information, wherein in a case where the electronic device can perform communication using the power, the control unit controls the communication unit such that a modulation degree indicating a degree to which an amplitude changes in amplitude modulation for the communication is smaller the higher the power transmitted by the power supply unit is.

Another aspect of the present invention provides, a control method of a power supply apparatus that comprises a power supply unit configured to perform wireless power supply to an electronic device, and a communication unit configured to communicate with the electronic device using power for the wireless power supply, the method comprising: acquiring, from the electronic device, predetermined information for performing communication using the power; communicating with the electronic device using the power; and controlling communication with the electronic device based on the predetermined information, wherein in the communicating, in a case where the electronic device can communicate using the power, communication in the communicating is controlled such that a modulation degree indicating a degree to which an amplitude changes in amplitude modulation for the communication is smaller the higher the power transmitted by the power supply unit is.

Still another aspect of the present invention provides, a non-transitory computer-readable storage medium storing a program for causing a computer to execute a control method of a power supply apparatus that comprises a power supply unit configured to perform wireless power supply to an electronic device and a communication unit configured to communicate with the electronic device using power for the wireless power supply, the method comprising: acquiring, from the electronic device, predetermined information for performing communication using the power; communicating with the electronic device using the power; and controlling communication with the electronic device in the communicating based on the predetermined information, wherein in the communicating, in a case where the electronic device can communicate using the power, communication in the communicating is controlled such that a modulation degree indicating a degree to which an amplitude changes in amplitude modulation for the communication is smaller the higher the power transmitted by the power supply unit is.

According to the present invention, communication can be performed while power supply is performed according to an electronic device to which the power is to be supplied, and the power of a modulated signal can be suppressed with respect to an increase in the power being supplied.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram showing an example of a functional configuration serving as an example of an electronic device according to the present embodiment.

FIG. 5 is a diagram for illustrating ASK modulation according to the present embodiment.

DESCRIPTION OF THE EMBODIMENTS

Hereinafter, an exemplary embodiment of the present invention will be described with reference to the drawings.

Exemplary Configuration of Power Supply System 100

Figure 1:
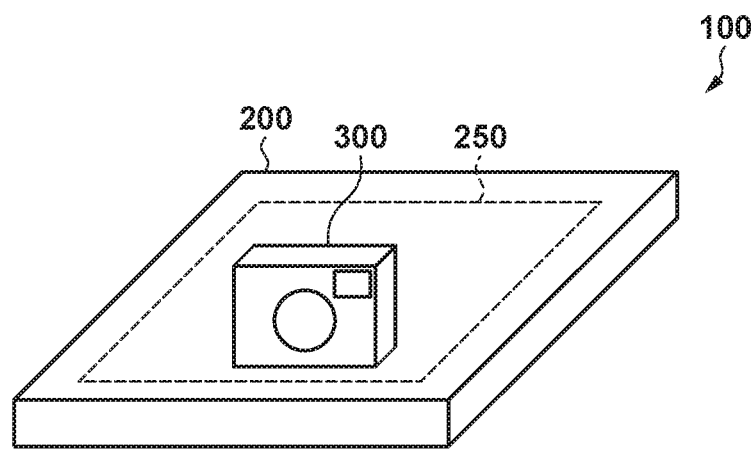
FIG. 1 is a diagram schematically showing an example of a wireless power supply system according to the present embodiment.

As shown in FIG. 1, a power supply system 100 according to the present embodiment includes a power supply apparatus 200 and an electronic device 300. If the electronic device 300 is within a predetermined range 250 above the power supply apparatus 200 and is within a predetermined range from the surface above the power supply apparatus 200 (this state is also simply referred to as being nearby), the power supply apparatus 200 can perform power supply wirelessly to the electronic device 300. Also, if the electronic device 300 is not nearby, the power supply apparatus 200 cannot supply power to the electronic device 300. Note that the predetermined range 250 may be any range in which the power supply apparatus 200 can communicate with the electronic device 300, and is not limited to a range in a housing of the power supply apparatus 200 as shown in FIG. 1. The power supply apparatus 200 can perform power supply wirelessly to multiple power receiving devices (devices that can receive power wirelessly), including the electronic device 300.

The electronic device 300 is a digital camera that can receive supplied power and communicate using a carrier wave for power supply. However, the present embodiment can also be applied to another device, as long as it is a device that can receive supplied power and communicate using a carrier wave for power supply. For example, the electronic device 300 may be a digital media player, a communication device such as a mobile telephone including a smartphone, a personal computer, a tablet terminal, a glasses-type or watch-type wearable terminal, or a game device. Also, the electronic device 300 may be a battery pack including a battery. Furthermore, the present embodiment can be applied not only to a device that can be placed in the predetermined range 250 illustrated in FIG. 1, but also to a printer, a display, or an automobile that can be placed so as to cover over the predetermined range 250.

Configuration of Power Supply Apparatus 200

Figure 2:
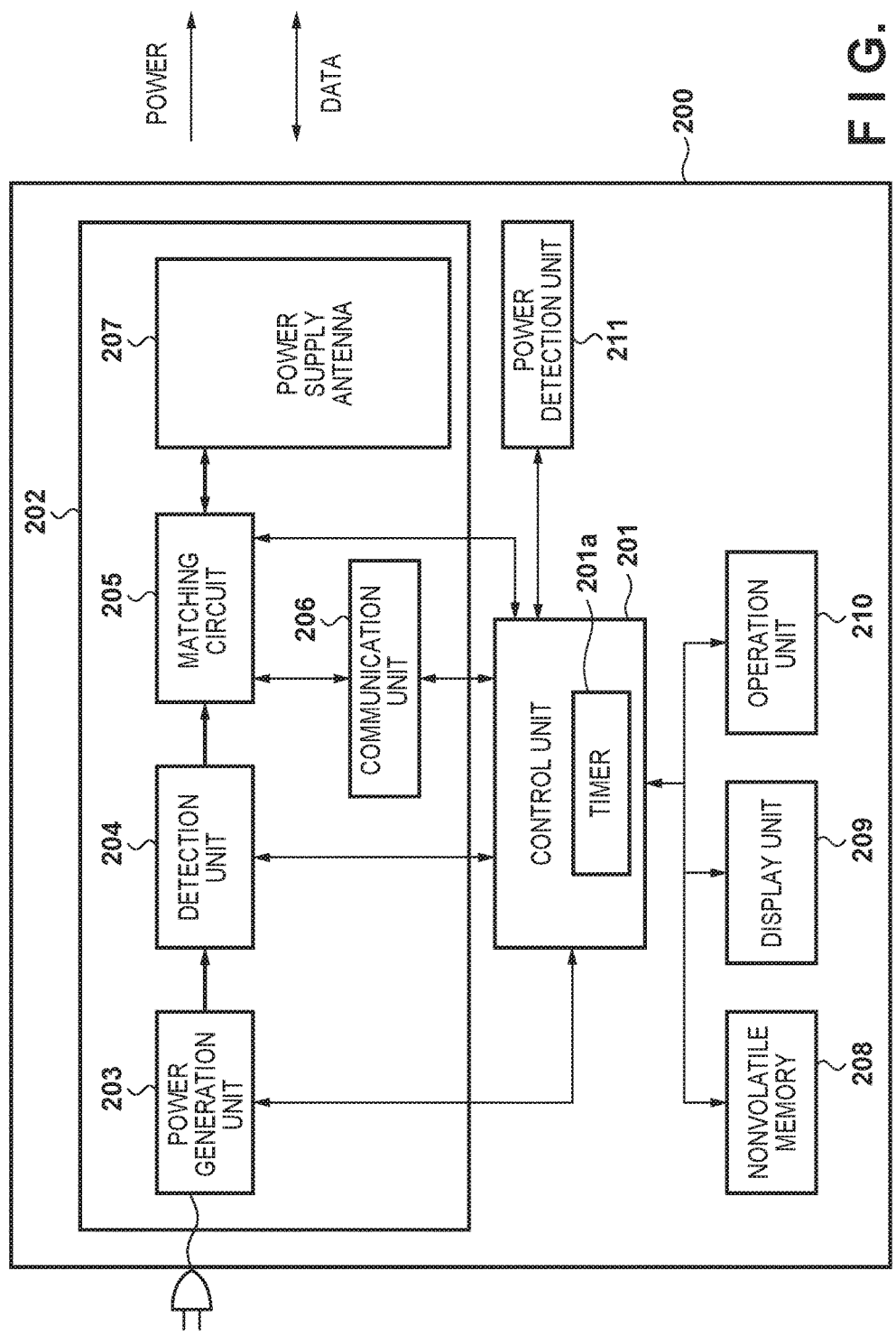
FIG. 2 is a block diagram showing an example of a functional configuration serving as an example of a power supply apparatus according to the present embodiment.

Next, an exemplary functional configuration of the power supply apparatus 200 according to the present embodiment will be described with reference to FIG. 2. The power supply apparatus 200 includes a control unit 201, a power supply unit 202, a nonvolatile memory 208, a display unit 209, an operation unit 210, and a power detection unit 211. Also, the power supply unit 202 includes a power generation unit 203, a detection unit 204, a matching circuit 205, a communication unit 206, and a power supply antenna 207. Note that one or more functional blocks shown in FIG. 2 may be realized by hardware such as an ASIC or a programmable logic array (PLA), or may be realized by a programmable processor such as a CPU or an MPU executing software. They also may be realized by a combination of software and hardware. Accordingly, even if different functional blocks are described as mainly operating in the following description, they can be realized mainly by the same hardware.

The control unit 201, for example, includes a CPU (Central Processing Unit) and a RAM (Random Access Memory). The control unit 201 loads the computer program stored in the nonvolatile memory 208 to the RAM and executes it, and thus performs overall control of the power supply apparatus 200. Also, the control unit 201 has a timer 201a for measuring the amount of time needed when controlling the operations of the units of the power supply apparatus 200.

The power supply unit 202 operates as power supply unit for performing wireless power supply conforming to a predetermined power supply method. As the predetermined power supply method, for example, a magnetic resonance method of transmitting power from the power supply apparatus 200 to the electronic device 300 in a state in which resonance is being performed between the power supply apparatus 200 and the electronic device 300 is used. The state in which resonance is being performed between the power supply apparatus 200 and the electronic device 300 is a state in which the resonance frequency of the power supply antenna 207 of the power supply apparatus 200 and the resonance frequency of the power receiving antenna 303 of the electronic device 300 match. Note that the power supply unit 202 may use a method other than the electrical field resonance method as the predetermined power supply method.

The power generation unit 203 uses power supplied from an AC power source (not shown) to generate power to be output to an external device via the power supply antenna 207. The power generated by the power generation unit 203 is supplied to the power supply antenna 207 via the detection unit 204 and the matching circuit 205. The power generated by the power generation unit 203 includes power (first power) to be used for the communication unit 206 to communicate with the electronic device 300, and power (second power) to be used for the electronic device 300 to perform charging or a predetermined operation. The first power is weak power that is 1 W or less, for example. For example, the first power may be power that is defined by the communication standard of the communication unit 206. The second power is power that is larger than the first power and is variable power that is 2 W or more, for example. The value of the second power is set in later-described control processing by the control unit 201. In the present embodiment, the second power can also be used for the communication unit 206 to communicate with the electronic device 300.

The detection unit 204 detects the VSWR (Voltage Standing Wave Ratio) of the power output from the power supply antenna 207 and supplies data indicating the detected VSWR to the control unit 201. The VSWR is a value that indicates the relationship between the traveling wave of the power output from the power supply antenna 207 and the reflected wave of the power output from the power supply antenna 207. The control unit 201 can use the data of the VSWR supplied from the detection unit 204 to detect whether or not at least one power receiving device exists in the predetermined range 250.

The matching circuit 205 includes a circuit that sets the resonance frequency of the power supply antenna 207. If the power supply apparatus 200 is to output one of the first power and the second power via the power supply antenna 207, the control unit 201 controls the matching circuit 205 such that the resonance frequency of the power supply antenna 207 is set to the predetermined frequency f. The predetermined frequency f is 13.56 MHz, for example. Also, the predetermined frequency f may be 6.78 MHz, and may be a frequency that is defined by the communication standard of the communication unit 206.

The communication unit 206 is a communication circuit or a communication module that performs near field communication, and for example, performs near field communication conforming to the NFC standard defined by the NFC (Near Field Communication) Forum. Also, the communication standard used by the communication unit 206 may be another communication standard, such as the ISO/IEC 18092 standard, the ISO/IEC 14443 standard, or the ISO/IEC 21481 standard, as long as near field communication is realized.

The communication unit 206 operates in a reader/writer mode (i.e., the power supply apparatus 200 acts as a reader/writer for IC cards or NFC tags) or a P2P mode defined by the NFC standard. If the communication unit 206 operates in the reader/writer mode, the communication unit 206 communicates based on the NFC standard with the electronic device 300 that operates in a card emulation mode (i.e., acts as an IC card or an NFC tag) defined by the NFC standard.

Also, if the communication unit 206 operates in the reader/writer mode, the communication unit 206 uses the first or second power to transmit and receive data corresponding to NDEF (NFC Data Exchange Format) with the electronic device 300 that operates in the card emulation mode. The power supply apparatus 200 and the electronic device 300 exchange information such as later-described wireless power supply authentication information, for example, using the NDEE data. Note that if the communication unit 206 operates in the reader/writer mode and the electronic device 300 operates in the P2P mode, the communication unit 206 cannot communicate with the electronic device 300.

On the other hand, if the communication unit 206 operates in the P2P mode, the communication unit 206 communicates with the electronic device 300 operating in the P2P mode based on the NFC standard. If the communication unit 206 operates in the P2P mode, the communication unit 206 transmits and receives data corresponding to NDEF with a power receiving device in the P2P mode using the first or second power.

The communication unit 206 outputs the second power from the power supply antenna 207 for a predetermined amount of time. In the following description, the period during which the second power is output from the power supply antenna 207 will be described as a predetermined amount of time. The predetermined amount of time is set by the control unit 201, for example.

The power supply antenna 207 is an antenna for outputting one of the first power and the second power. The power supply antenna 207 is used also for the communication unit 206 to communicate with the electronic device 300 in accordance with the NFC standard.

The nonvolatile memory 208 includes a semiconductor memory or the like that can hold data even if there is no longer a supply of power, for example, and the nonvolatile memory 208 stores computer programs for controlling the power supply apparatus 200. Furthermore, the nonvolatile memory 208 stores identification data for the power supply apparatus 200, power supply parameters relating to the power supply apparatus 200, flags for controlling power supply, and the like. Also, the nonvolatile memory 208 can store data received by the communication unit 206.

The display unit 209 includes an LCD or OLED panel, for example, and displays a graphical user interface for operating the power supply apparatus 200, image data supplied from the nonvolatile memory 208, and the like. The operation unit 210 provides a user interface for operating the power supply apparatus 200. The operation unit 210 includes operation members such as buttons, switches, and a touch panel for operating the power supply apparatus 200. The control unit 201 controls the power supply apparatus 200 in accordance with input signals input via the operation unit 210. The power detection unit 211 includes a sensor member, for example, detects the power output from the power supply antenna 207, and supplies data indicating the detected power to the control unit 201.

Note that in the example of the present embodiment, the power supply apparatus 200 is described as supplying power wirelessly, but "wireless" can be rephrased as "non-contact" or "contactless".

Configuration of Electronic Device 300

Next, an exemplary functional configuration of the electronic device 300 will be described with reference to FIG. 3. The electronic device 300 includes a control unit 301, a power receiving unit 302, a detection unit 307, a regulator 308, a load unit 309, a charging unit 310, a battery 311, a nonvolatile memory 312, and an operation unit 313. Also, the power receiving unit 302 includes a power receiving antenna 303, a matching circuit 304, a rectification smoothing circuit 305, and a communication unit 306. Note that one or more functional blocks shown in FIG. 3 may be realized by hardware such as an ASIC or a PLA, or may be realized by a programmable processor such as a CPU or an MPU executing software. They also may be realized by a combination of software and hardware. Accordingly, even if different functional blocks are described as mainly operating in the following description, they can be realized by mainly the same hardware.

The control unit 301 includes a CPU and a RAM, loads the computer program stored in the nonvolatile memory 312 to the RAM and executes it, and thus controls the electronic device 300.

The power receiving unit 302 corresponds to the above-described predetermined power supply method (in the example of the present embodiment, the magnetic resonance method) and is used to wirelessly receive power from the power supply apparatus 200. The power receiving antenna 303 is an antenna for receiving power supplied from the power supply apparatus 200. The power receiving antenna 303 is used also for the communication unit 306 to communicate with the power supply apparatus 200 in accordance with the NFC standard. The power received from the power supply apparatus 200 via the power receiving antenna 303 is supplied to the rectification smoothing circuit 305 via the matching circuit 304.

The matching circuit 304 includes a circuit that sets the resonance frequency of the power receiving antenna 303. The matching circuit 304 can set the resonance frequency of the power receiving antenna 303 by being controlled from the control unit 301. The rectification smoothing circuit 305 generates DC power from the power received by the power receiving antenna 303. Furthermore, the rectification smoothing circuit 305 supplies the generated DC power to the regulator 308 via the detection unit 307. If data is superimposed on the power received by the power receiving antenna 303, the data extracted from the power received by the power receiving antenna 303 is supplied to the communication unit 306.

The communication unit 306 communicates with the power supply apparatus 200 based on the same communication standard as the communication unit 206. The communication unit 306 analyzes the data supplied from the rectification smoothing circuit 305. Thereafter, the communication unit 306 uses the data analysis results to transmit data requested by the power supply apparatus 200 to the power supply apparatus 200, or store data received from the power supply apparatus 200. Furthermore, the communication unit 306 transmits data corresponding to the data supplied from the rectification smoothing circuit 305 to the power supply apparatus 200. Note that the communication unit 306 operates using one of the card emulation mode and the P2P mode as the communication mode.

The detection unit 307 detects the power received via the power receiving antenna 303 and supplies data indicating the detected power to the control unit 301.

In response to an instruction from the control unit 301, the regulator 308 supplies at least one of the power supplied from the rectification smoothing circuit 305 and the power supplied from the battery 311 to the units of the electronic device 300. The load unit 309 includes an image capturing unit (not shown) that generates image data of still images, moving images, and the like based on an optical image of a subject, and includes a member or mechanism for displaying the power of a reproduction unit (not shown) that reproduces the image data, and the like. If the electronic device 300 is in a power source ON mode, the power is supplied from the regulator 308 to the load unit 309. If the electronic device 300 is in a power source OFF mode or a standby mode, the power supply from the regulator 308 to the load unit 309 is restricted.

The charging unit 310 includes a charging circuit or a charging module that charges the battery 311. In response to an instruction from the control unit 301, the charging unit 310 determines whether to charge the battery 311 using the power supplied from the regulator 308 or to supply the power discharged from the battery 311 to the regulator 308. The charging unit 310 periodically detects the remaining capacity of the battery 311 and provides data indicating the remaining capacity of the battery 311. Also, the charging unit 310 provides the control unit 301 with data relating to the battery state of the battery 311 and data relating to the characteristics of the battery 311.

The battery 311 is a secondary battery that can be charged with a predetermined voltage and can be connected to the electronic device 300. Note that although it is desirable that the battery 311 is built in the electronic device 300, the battery 311 may be used by being connected to the electronic device 300 without being built-in.

The nonvolatile memory 312 includes a semiconductor memory or the like that can hold data even if there is no supply of power, for example, and the nonvolatile memory 312 stores data such as computer programs for controlling the electronic device 300 and parameters relating to the electronic device 300. The operation unit 313 provides a user interface for operating the electronic device 300. The control unit 301 controls the electronic device 300 in accordance with input signals input via the operation unit 313.

Figure 4A:
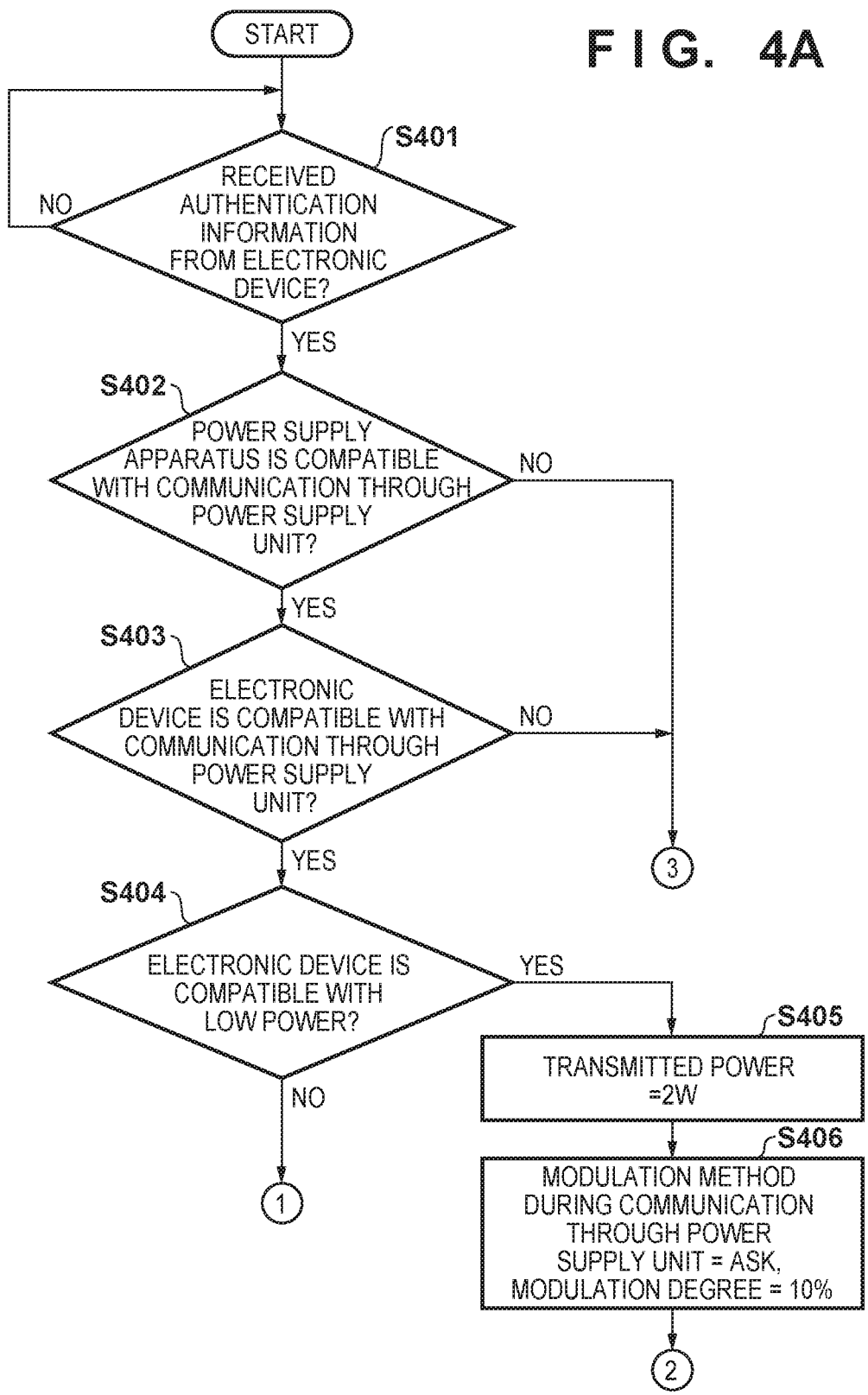
FIGS. 4A and 4B are flowcharts showing a series of operations for control processing performed by the power supply apparatus before the start of power supply, according to the present embodiment.
Figure 4B:
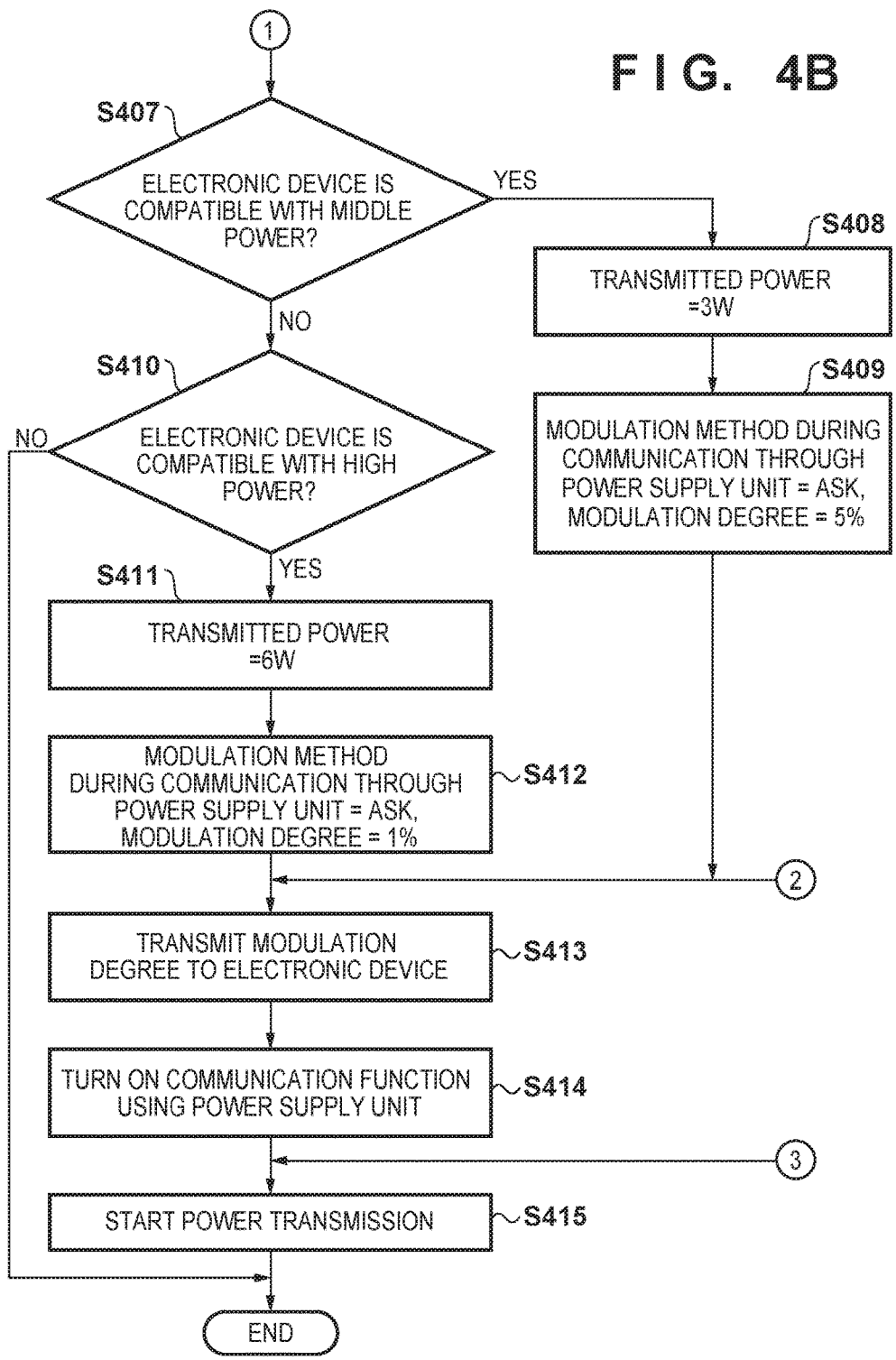

Control Processing Performed by the Power Supply Apparatus 200 Before the Start of Wireless Power Supply Next, a series of operations of control processing before the start of wireless power supply will be described with reference to FIGS. 4A and 4B. This processing is realized by the control unit 201 loading a computer program stored in the nonvolatile memory 208 to the RAM and executing it. This processing is started in the power supply apparatus 200 when changed to a power supply mode for supplying power.

In step S401, the control unit 201 determines whether or not wireless power supply authentication information was received from the electronic device 300 via the communication unit 206 in the period during which the first power was being output. The wireless power supply authentication information is communicated using the NDEF data. The wireless power supply authentication information includes, for example, information indicating whether or not the electronic device 300 is compatible with the wireless power supply performed using the second power, and information indicating whether or not the electronic device 300 is compatible with communication using the second power, the power reception power class, and the like. The power reception power class includes information indicating the received power that the electronic device 300 is compatible with (e.g., which of low power, middle power, or high power the electric device 300 is compatible with, etc.). If it is determined that the wireless power supply authentication information has been received via the communication unit 206, the control unit 201 acquires the above-described information from the wireless power supply authentication information. In this case, the control unit 201 advances to the processing of step S402, and in other cases, the control unit 201 returns to the processing of step S401.

In step S402, the control unit 201 determines whether or not the power supply apparatus 200 is compatible with communication using the second power (i.e., communication through a power supply unit). The control unit 201 determines whether or not the power supply apparatus 200 is compatible with communication using the second power by referring to the information indicating compatible functions of the power supply apparatus, which is stored in the nonvolatile memory 208, for example. If it is determined that the power supply apparatus 200 is compatible with communication using the second power, the control unit 201 advances to the processing of step S403. On the other hand, if it is determined that the power supply apparatus 200 is not compatible with communication using the second power, the control unit 201 advances to the processing of step S415.

In step S403, the control unit 201 determines whether or not the electronic device 300 is compatible with communication using the second power by referring to the information indicating whether or not the electronic device 300 is compatible, which was acquired from the wireless power supply authentication information received in step S401. If it is determined that the electronic device 300 is compatible with communication using the second power, the control unit 201 advances to the processing of step S404. On the other hand, if it is determined that the electronic device 300 is not compatible with communication using the second power, the control unit 201 advances to the processing of step S415.

In step S404, the control unit 201 determines whether or not the power reception power class of the electronic device 300 is low power compatible by referring to the power reception power class acquired from the wireless power supply authentication information received in step S401. In step S404, if it is determined that the power reception power class of the electronic device 300 is low power compatible, the control unit 201 advances to the processing to step S405 to set the power at the time of wireless power supply. If it is determined that the power reception power class of the electronic device 300 is not low power compatible, the control unit 201 advances to the processing of step S407.

In step S405, the control unit 201 sets the power during wireless power supply using the second power to 2 W and thereafter advances to the processing of step S406. In step S406, the control unit 201 sets the modulation method during communication using the second power to an amplitude shift keying (ASK) method, which is amplitude modulation, and sets the modulation degree to 10%. The ASK modulation method and the modulation degree will be described later. The control unit 201 thereafter advances to the processing of step S413.

In step S407, the control unit 201 determines whether or not the power reception power class of the electronic device 300 is middle power compatible by referring to the above-described information of the power reception power class. In step S407, if it is determined that the power reception power class of the electronic device 300 is middle power compatible, the control unit 201 advances to the processing of step S408 to set the power at the time of wireless power supply. On the other hand, if it is determined that the power reception power class of the electronic device 300 is not middle power compatible, the control unit 201 advances to the processing of step S410.

In step S408, the control unit 201 sets the power during wireless power supply using the second power to 3 W and thereafter advances to the processing of step S409. In step S409, the control unit 201 sets the modulation method during communication using the second power to an ASK method and sets the modulation degree to 5%. The control unit 201 thereafter advances to the processing of step S413.

In step S410, the control unit 201 determines whether or not the power reception power class of the electronic device 300 is high power compatible by referring to the above-described information of the power reception power class. If it is determined that the power reception power class of the electronic device 300 is high power compatible, the control unit 201 advances to the processing of step S411 to set the power during wireless power supply. If it is determined that the power reception power class of the electronic device 300 is not high power compatible, the control unit 201 cannot determine the power class of the electronic device, and therefore the series of operations for this processing is ended.

In step S411, the control unit 201 sets the power during wireless power supply using the second power to 6 W and advances to the processing of step S412. In step S412, the control unit 201 sets the modulation method during communication using the second power to the ASK method and sets the modulation degree to 1%. The control unit 201 thereafter advances to the processing of step S413.

In step S413, the control unit 201 transmits information indicating the modulation degree set in the power supply apparatus 200 to the electronic device 300 via the communication unit 206 (using the first power) in order to notify the electronic device 300 of the modulation degree of the power supply apparatus 200. The modulation level notified to the electronic device 300 is the modulation level determined in step S406, S409, or S412 above. The control unit 201 thereafter advances to the processing of step S414.

In step S414, the control unit 201 turns on (enables) the function of communication using the second power and thereafter advances to the processing of step S415. In step S415, the control unit 201 starts power transmission using the second power with the transmitted power size determined in step S405, S408, or S411.

Here, if the function of communication using the second power has been enabled in step S414, the control unit 201 can communicate via the communication unit 206 during wireless power supply using the second power. In other words, when communication is performed during wireless power supply using the second power, the control unit 201 performs communication by modulating the second power using the modulation method (ASK) and the modulation degree determined in step S406, S409, or S412.

Description Relating to ASK Modulation and Modulation Degree

Here, the ASK modulation method and the modulation degree will be described with reference to FIG. 5. The ASK modulation method according to the present embodiment generates a modulated wave by changing the amplitude of the carrier wave 502 from V1 to V0 using the two states (i.e., "1" and "0") of the digital signal 501 (i.e., the modulation signal (base band signal) indicating the information to be transmitted). Although the magnitude relationship between V1 and V0 does not matter, for the sake of convenience in the description, the state of V1 is a state of having a large amplitude and not being modulated, and the state of V0 is a state of having a small amplitude and being modulated. In the present embodiment, the "modulation degree" is used as information indicating the degree to which the amplitude of the signal changes due to modulation in ASK modulation, and is expressed as a percentage (%). Here, the modulation degree is given by $m=(a-b)/(a+b) \times 100(\%)$, where a is the peak-to-peak width at the amplitude in the large-amplitude state, and b is the peak-to-peak width at the amplitude in the small-amplitude state. In other words, it is expressed using a ratio of the difference between the amplitudes with respect to the sum of the amplitudes.

Figure 6:
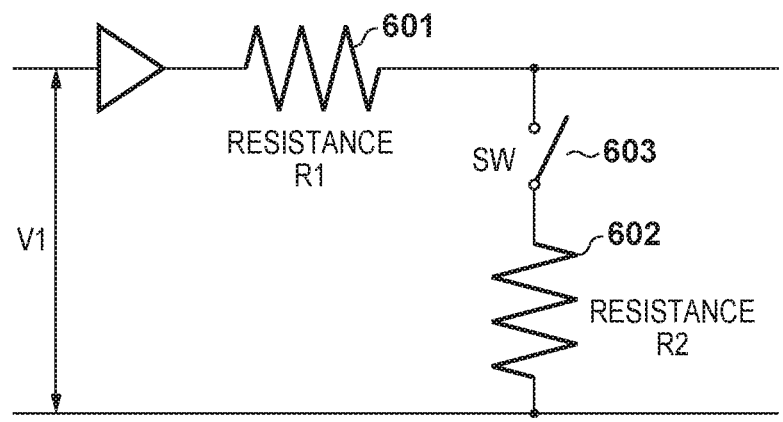
FIG. 6 is a configuration for performing ASK modulation according to the present embodiment.

Furthermore, a configuration for performing ASK modulation, which is included in the communication unit 206, will be described with reference to FIG. 6. The ASK signal can be generated by switching on and off a switch 603 that is connected to a variable resistor 601 (resistance R1) and a variable resistor 602 (resistance R2). When the switch 603 is off, the amplitude of the carrier wave 502 is V1, and when the switch 603 is on, the amplitude of the carrier wave 502 is $V0=(R2/(R1+R2)) \times V1$. The control unit 201 can control the modulation degree by adjusting the resistance R1 of the variable resistor 601 of the ASK modulator in the communication unit 206 and the resistance R2 of the variable resistor 602.

In the processing described above in FIGS. 4A and 4B, the control unit 201 sets the modulation degree to 10% when the transmitted power is 2 W, sets the modulation degree to 5% when the transmitted power is 3 W, and sets the modulation degree to 1% when the transmitted power is 6 W, and thus the control unit 201 sets the modulation degree to be smaller the larger the transmitted power is. Accordingly, even if the transmitted power increases, the gain of the frequency characteristic in ASK modulation can be suppressed. In other words, even if the output during power supply is increased at a time of communicating while performing power supply, the strength of the power of the modulated wave can be suppressed. In particular, even if the output during power supply increases, the frequency characteristic at a time of communication during power transmission can be kept within the range allowed by the radio wave regulation. On the other hand, when the output during power transmission is small, the above-described difference between V0 and V1 can be made larger by keeping the modulation degree large, and therefore the communication sensitivity during power transmission can be increased.

Figure 7:
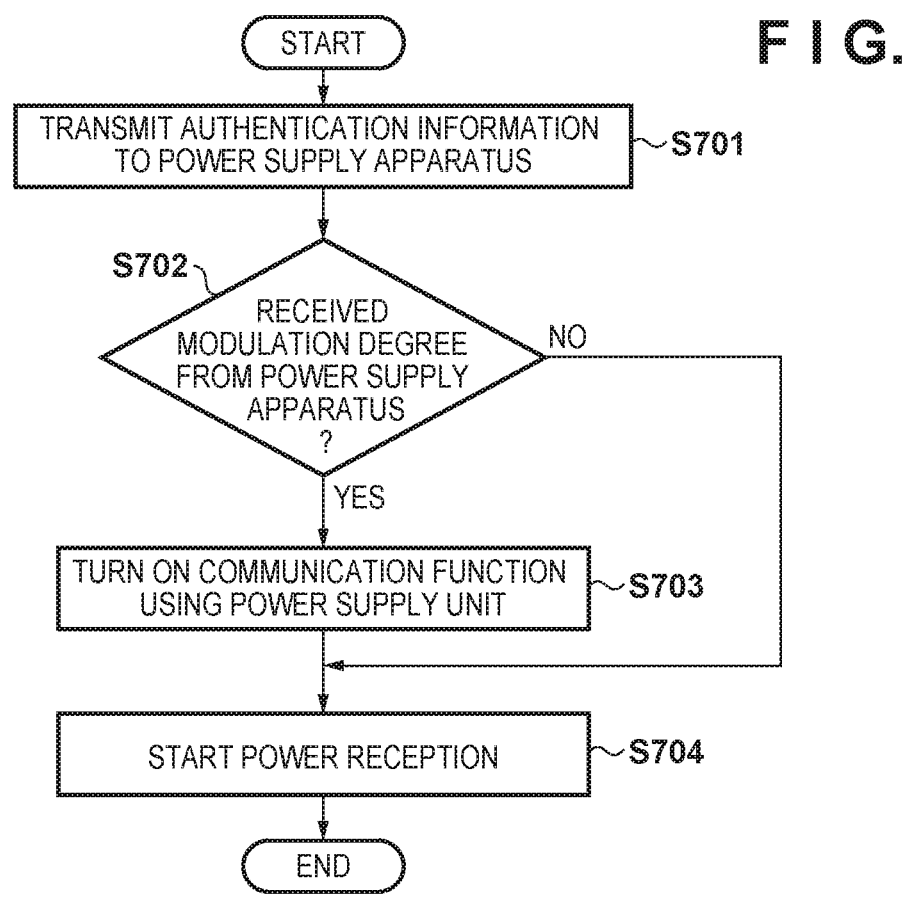
FIG. 7 is a flowchart showing a series of operations for control processing performed by the electronic device before the start of power supply, according to the present embodiment.

Control Processing Performed by the Electronic Device 300 Before the Start of Wireless Power Supply Next, a series of operations for control processing performed by the electronic device 300 before the start of wireless power supply will be described with reference to FIG. 7. This processing is realized by the control unit 301 loading a computer program stored in the nonvolatile memory 312 to the RAM and executing it. This processing is started in the electronic device 300 when changed to a power receiving mode for power reception.

In step S701, the control unit 301 transmits the wireless power supply authentication information to the power supply apparatus 200 via the communication unit 306. As described above, the wireless power supply authentication information includes information indicating whether or not the electronic device 300 is compatible with the wireless power supply performed using the second power, and information such as the power reception power class, which indicates whether or not the electronic device 300 is compatible with communication using the second power. The control unit 301 thereafter advances to the processing of step S702.

In step S702, the control unit 301 determines whether or not the modulation degree information has been received from the power supply apparatus 200 via the communication unit 306. If it is determined that the modulation degree information has been received, the control unit 301 advances to the processing of step S703, and if it is determined that the modulation information has not been received, the control unit 301 advances to the processing of step S704. Note that the modulation degree information received from the power supply apparatus 200 includes the modulation degree determined in step S406, S409, or S412 shown in FIG. 4A or 4B.

In step S703, the control unit 301 turns on (enables) the function of communicating using the second power, and thereafter advances to the processing of step S704. In step S704, the control unit 301 starts power reception using the second power from the power supply apparatus 200 with the size of transmitted power determined in step S405, S408, or S411 shown in FIG. 4A or 4B. Here, if the function of communication using the second power has been turned on in step S703, the control unit 301 can communicate via the communication unit 306 during wireless power supply using the second power. When performing communication during wireless power supply using the second power, the control unit 301 performs communication by modulating or load-modulating the second power using the modulation degree received from the power supply apparatus 200 in step S702.

Figure 8:
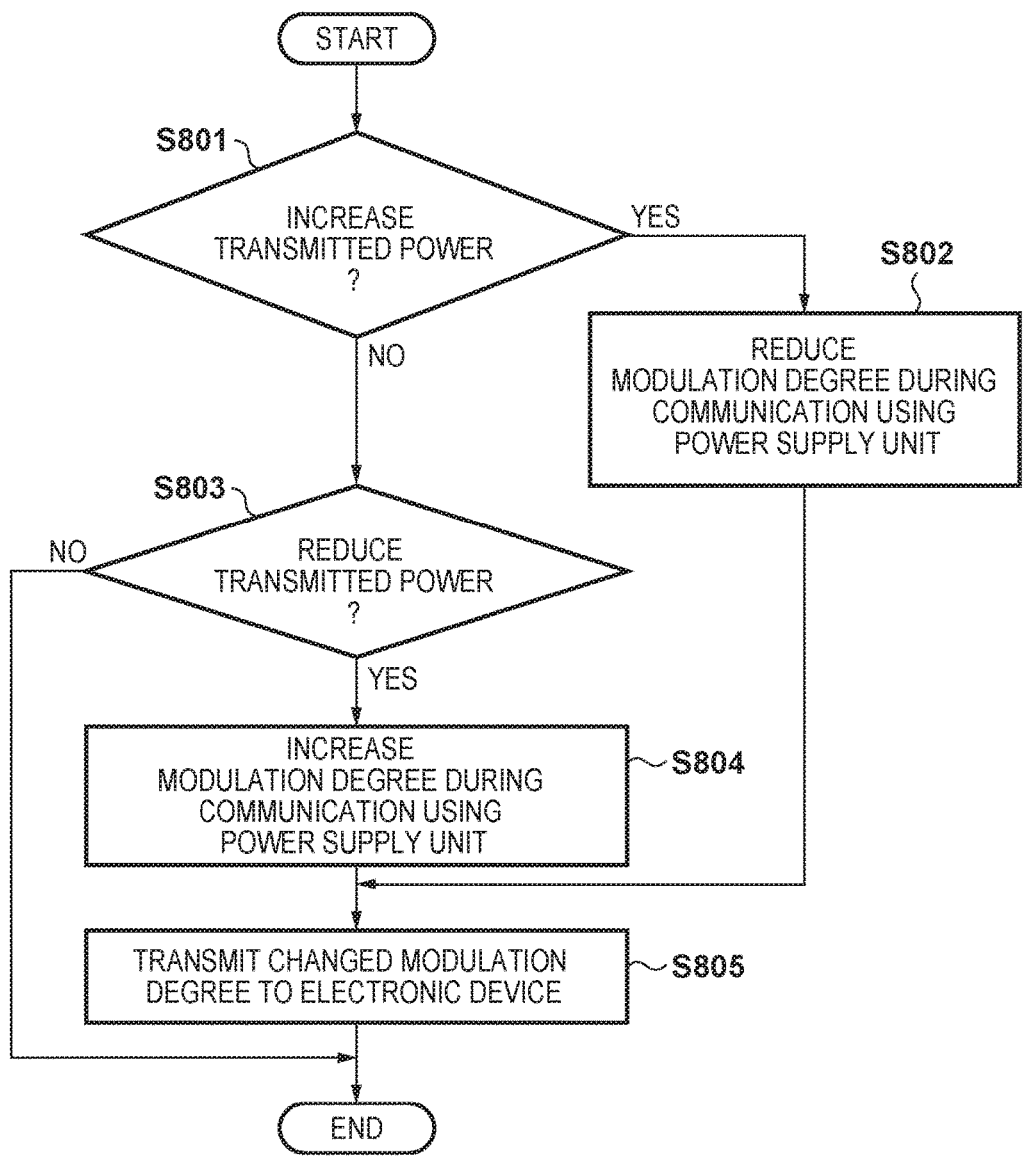
FIG. 8 is a flowchart showing a series of operations for control processing performed by the power supply apparatus during wireless power supply, according to the present embodiment.

Control Processing Performed by the Power Supply Apparatus 200 During Wireless Power Supply Next, a series of operations of control processing after the start of wireless power supply, performed by the power supply apparatus 200 will be described with reference to FIG. 8. The control processing according to this processing is realized by the control unit 201 loading a computer program stored in the nonvolatile memory 208 to the RAM and executing it. This processing is executed by the power supply apparatus 200 after the communication function using the second power is enabled in step S414 shown in FIG. 4B and thereafter the transmission in step S415 is started. Also, in the communication during wireless power supply using the second power, the carrier wave output at the second power is modulated using the transmitted power and the modulation degree determined in the control processing shown in FIGS. 4A and 4B.

In step S801, the control unit 201 determines whether or not to increase the second power generated by the power generation unit 203. If it is determined that the second power is to be increased, the processing advances to step S802, and if it is determined that the second power is not to be increased, the processing advances to step S805.

In step S802, the control unit 201 reduces the modulation degree during communication using the second power in order to suppress the gain when increasing the second power. If the control unit 201 sets the transmitted power to 0.3 W, for example, sets the modulation degree to 5% through the control processing shown in FIG. 4B, and will increase the transmitted power to 4 W thereafter, the control unit 201 reduces the modulation degree to 3%, for example. Accordingly, the gain of the frequency characteristic in ASK modulation can be suppressed to a small value even if the transmitted power increases.

In step S803, if the control unit 201 reduces the second power generated by the power generation unit 203, the processing advances to step S804. If the second power generated by the power generation unit 203 is not to be reduced, the control unit 201 ends this processing.

In step S804, the control unit 201 increases the modulation degree during communication using the second power. For example, if the control unit 201 sets the transmitted power to 3 W, sets the modulation degree to 5% in the control processing shown in FIG. 4B, and will reduce the transmitted power to 2 W thereafter, the control unit 201 increases the modulation degree to 10%, for example. Accordingly, when the transmitted power is small, the communication sensitivity during power transmission can be increased by increasing the modulation degree. The control unit 201 advances to the processing of step S805 after the modulation degree is changed.

In step S805, the control unit 201 transmits information indicating the changed modulation degree to the electronic device 300 using the first or second power via the communication unit 206. The modulation degree information transmitted to the electronic device 300 is the modulation degree determined in step S406, S409, or S412 in the flowchart of FIG. 4A or 4B. At this time, if the information indicating the changed modulation degree is transmitted using the second power, the information can be transmitted while power supply is continued. The control unit 201 thereafter ends this processing.

Figure 9:
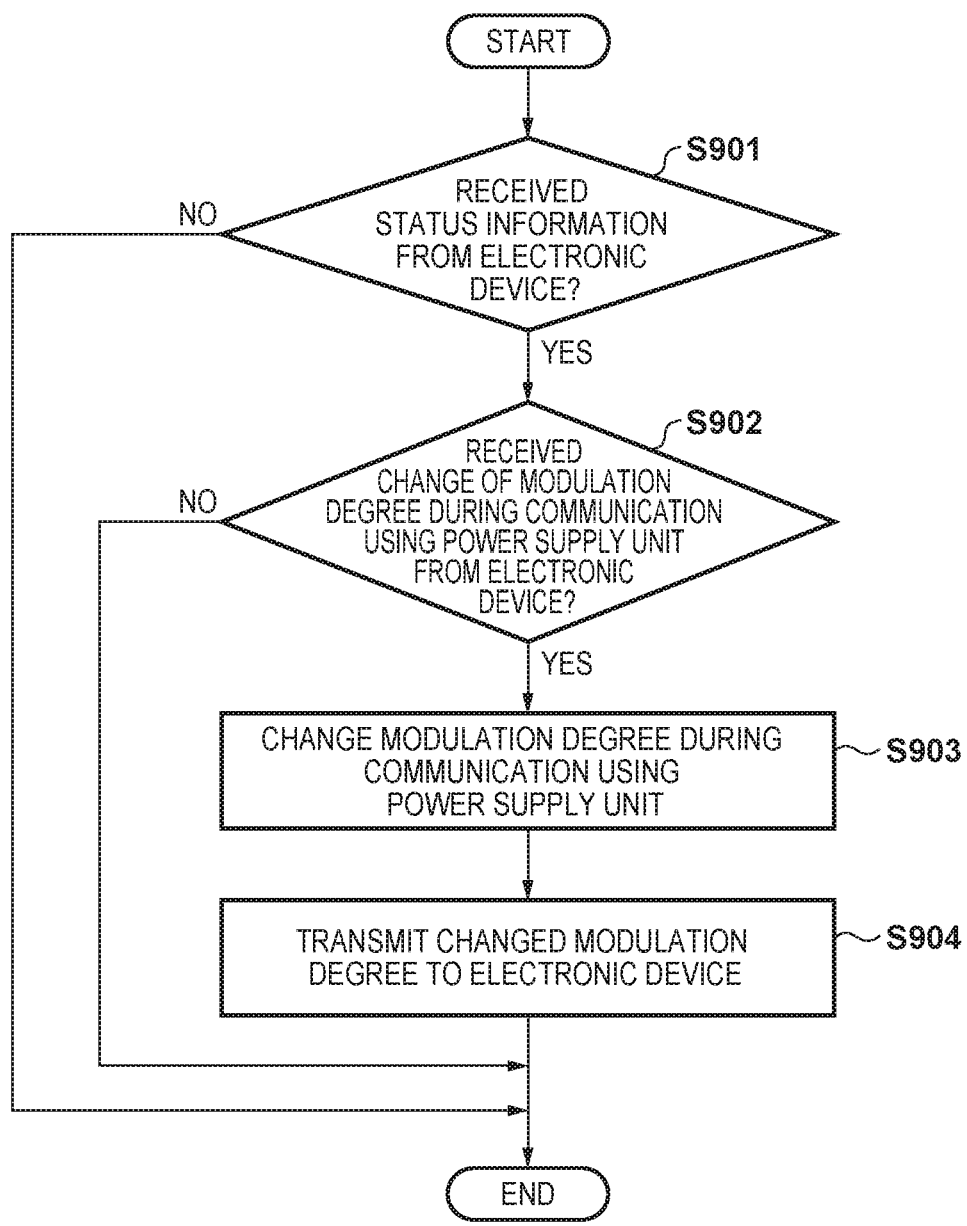
FIG. 9 is a flowchart showing a series of operations for control processing performed by the power supply apparatus after receiving status information, according to the present embodiment.

Control Processing Performed by the Power Supply Apparatus 200 after the Status Information is Received Next, a series of operations of control processing performed by the power supply apparatus 200 after the status information is received will be described with reference to FIG. 9. The control processing is realized by the control unit 201 loading a computer program stored in the nonvolatile memory 208 to the RAM and executing it. Also, this processing is executed by the power supply apparatus 200 after the communication function using the second power is enabled in step S414 shown in FIG. 4B and thereafter the transmission in step S415 is started. In other words, it is possible to perform communication via the communication unit 206 during wireless power supply using the second power.

In step S901, the control unit 201 determines whether or not the wireless power supply status was received from the electronic device 300 via the communication unit 206 in the period during which the second power was being output. Note that the wireless power supply status information is NDEF data, which is data by which the electronic device 300 indicates the status of wireless power supply performed using the second power. The wireless power supply status information includes information such as battery information of the electronic device 300, and whether or not the modulation degree during communication performed by the electronic device 300 using the second power has been requested. If it is determined that the wireless power supply status information has been received from the electronic device 300 via the communication unit 206, the control unit 201 advances to the processing of step S902. If not, this processing is ended.

In step S902, the control unit 201 refers to the wireless power supply status information received in step S901 to determine whether or not the electronic device 300 has requested a modulation degree change during communication performed using the second power. If it is determined that the electronic device 300 has requested a modulation degree change during communication using the second power, the control unit 201 advances to the processing of step S903. On the other hand, if it is determined that the electronic device 300 has not requested a modulation degree change during communication using the second power, the control unit 201 ends this processing.

In step S903, the control unit 201 changes the modulation degree during communication using the second power generated by the power generation unit 203. The control unit 201, for example, refers to the wireless power supply status information, and if the request to change the modulation degree during communication using the second power from the electronic device 300 indicates increasing the modulation degree, the control unit 201 increases the modulation degree.

In step S904, the control unit 201 transmits the changed modulation degree information to the electronic device 300 using the first or second power via the communication unit 206. The modulation degree information transmitted to the electronic device 300 is the changed modulation degree, which was changed in step S903. As described above, if the changed modulation degree information is transmitted using the second power, the information can be transmitted while power supply is continued. The control unit 201 ends the series of operations according to this processing when the changed modulation degree is transmitted.

As described above, in the present embodiment, the power supply apparatus 200 acquires information indicating the compatible abilities and whether or not communication during power supply is possible from the electronic device 300, and controls power transmission and communication with the electronic device 300 according to this information. Also, when performing communication with the electronic device 300 using the carrier wave for performing power supply, the modulation degree of the amplitude at a time of performing ASK modulation is set to be smaller the larger the transmitted power of the carrier wave is. On the other hand, the modulation degree is kept large when the transmitted power of the carrier wave is small. Accordingly, even if the transmitted power increases, the gain of the frequency characteristic in ASK modulation can be suppressed to a small value. In other words, communication is performed while performing power supply according to the electronic device to which power is to be supplied, and the power of the modulated wave can be suppressed in response to an increase in the power to be supplied. On the other hand, when the output during power transmission is small, the communication sensitivity during power transmission can be increased.

OTHER EMBODIMENTS

Also, the power supply apparatus according to the present invention is not limited to being the power supply apparatus 200 described in the present embodiment. The power supply apparatus according to the present embodiment can also be realized by, for example, a system constituted by multiple apparatuses. Also, the electronic device according to the present invention is not limited to being the electronic device 300 described in the present embodiment. For example, the electronic device according to the present embodiment can also be realized by a system constituted by multiple apparatuses.

Furthermore, it goes without saying that the computer program according to the present invention may realize the various processes and functions described in the present embodiment using an OS (Operating System) or the like that runs on a computer.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-038678, filed Mar. 1, 2017, which is hereby incorporated by reference herein ill its entirety.

What is claimed is:

1. A power supply apparatus comprising:
a power supply unit configured to perform wireless power supply to an electronic device;
a communication unit configured to communicate with the electronic device using power for the wireless power supply;
one or more processors; and
a memory storing instructions which, when the instructions are executed by the one or more processors, cause the power supply apparatus to function as:
an acquisition unit configured to acquire, from the electronic device, predetermined information for performing communication using the power; and
a control unit configured to control communication with the electronic device by the communication unit based on the predetermined information,
wherein in a case where the electronic device can perform communication using the power, the control unit controls the communication unit such that a modulation degree indicating a degree to which an amplitude changes in amplitude modulation for the communication is smaller the higher the power transmitted by the power supply unit is.

2. The power supply apparatus according to claim 1, wherein based on information that is included in the predetermined information and indicates whether or not the electronic device is compatible with communication using the power, the control unit determines whether or not the electronic device can communicate using the power.

3. The power supply apparatus according to claim 1, wherein based on information that is included in the predetermined information and indicates a received power that the electronic device is compatible with, the control unit determines the transmitted power.

4. The power supply apparatus according to claim 1, wherein the control unit further outputs the modulation degree to be used when communication is performed using the power, in order to notify the modulation degree to the electronic device.

5. The power supply apparatus according to claim 1, wherein in a case where the modulation degree is to be changed after communication with the electronic device using the power is started, the control unit further outputs the modulation degree in order to notify the modulation degree to the electronic device through the communication.

6. The power supply apparatus according to claim 4, wherein the control unit changes communication for performing notification to the electronic device such that the communication after communication is started with the electronic device using the power is different from that before the communication is started.

7. The power supply apparatus according to claim 1, wherein through the communication, the control unit receives a request to change the modulation degree from the electronic device after communication with the electronic device using the power is started, and changes the modulation degree based on the request.

8. The power supply apparatus according to claim 1, wherein the control unit performs the amplitude modulation using an ASK method.

9. The power supply apparatus according to claim 1, wherein the modulation degree is obtained by using a ratio of a difference between a first amplitude and a second amplitude that are to be used in the amplitude modulation, with respect to a sum of the first amplitude and the second amplitude.

10. A control method of a power supply apparatus that comprises a power supply unit configured to perform wireless power supply to an electronic device, and a communication unit configured to communicate with the electronic device using power for the wireless power supply, the method comprising:
acquiring, from the electronic device, predetermined information for performing communication using the power;
communicating with the electronic device using the power; and
controlling communication with the electronic device based on the predetermined information,
wherein in the communicating, in a case where the electronic device can communicate using the power, communication in the communicating is controlled such that a modulation degree indicating a degree to which an amplitude changes in amplitude modulation for the communication is smaller the higher the power transmitted by the power supply unit is.

11. A non-transitory computer-readable storage medium storing a program for causing a computer to execute a control method of a power supply apparatus that comprises a power supply unit configured to perform wireless power supply to an electronic device and a communication unit configured to communicate with the electronic device using power for the wireless power supply, the method comprising:
acquiring, from the electronic device, predetermined information for performing communication using the power;
communicating with the electronic device using the power; and
controlling communication with the electronic device in the communicating based on the predetermined information,
wherein in the communicating, in a case where the electronic device can communicate using the power, communication in the communicating is controlled such that a modulation degree indicating a degree to which an amplitude changes in amplitude modulation for the communication is smaller the higher the power transmitted by the power supply unit is.

* * * * *